(12) United States Patent
Tripp et al.

(10) Patent No.: US 12,505,918 B2
(45) Date of Patent: Dec. 23, 2025

(54) PROCESSING MEASUREMENT INFORMATION TO SELECT LABELS FOR VOXELS OR PIXELS OF A MEDICAL IMAGE DATASET

(71) Applicants: Siemens Healthineers AG, Forchheim (DE); King's College London, London (GB)

(72) Inventors: Donovan Tripp, London (GB); Karl-Philipp Kunze, London (GB); Claudia Prieto, London (GB); Rene Botnar, London (GB); Radhouene Neji, London (GB)

(73) Assignees: Siemens Healthineers AG, Forchheim (DE); King's College London, London (GB)

( * ) Notice: Subject to any disclaimer, the term of this patent is extended or adjusted under 35 U.S.C. 154(b) by 0 days.

(21) Appl. No.: 19/056,956

(22) Filed: Feb. 19, 2025

(65) Prior Publication Data

US 2025/0266153 A1 Aug. 21, 2025

(30) Foreign Application Priority Data

Feb. 20, 2024 (EP) .................................. 24158598

(51) Int. Cl.
*G16H 30/40* (2018.01)
*A61B 5/055* (2006.01)
*G06T 15/00* (2011.01)

(52) U.S. Cl.
CPC ............. *G16H 30/40* (2018.01); *A61B 5/055* (2013.01); *G06T 15/00* (2013.01)

(58) Field of Classification Search
CPC .......... G16H 30/40; A61B 5/055; G06T 15/00
See application file for complete search history.

(56) References Cited

U.S. PATENT DOCUMENTS

| 2016/0110632 | A1* | 4/2016 | Kiraly ....................... G06T 7/11 |
| | | | 382/128 |
| 2017/0160363 | A1 | 6/2017 | Chen et al. |
| 2018/0096191 | A1* | 4/2018 | Wan ...................... G06V 10/772 |
| 2020/0341089 | A1* | 10/2020 | McGivney .......... G01R 33/5614 |

(Continued)

OTHER PUBLICATIONS

Aug. 1, 20243 (EP) Extended European Search Report—App. EP 24158598.3.

(Continued)

*Primary Examiner* — Michael Robert Cammarata
*Assistant Examiner* — Jose M Torres
(74) *Attorney, Agent, or Firm* — Banner & Witcoff, Ltd.

(57) ABSTRACT

Techniques are described for processing measurement information to select a respective label for multiple voxels or pixels of a medical image dataset. Reference information is described comprising a respective reference dataset for each one of the possible labels, and each label is associated with a material parameter. A respective label for the respective voxel or pixel is selected by using a discrete optimization algorithm to optimize a cost function comprising a first partial cost function and a second partial cost function, and the incorporation of the second partial cost function into the cost function introduces a coupling between the labels at different voxels or pixels.

11 Claims, 2 Drawing Sheets

(56) References Cited

U.S. PATENT DOCUMENTS

2022/0349972 A1* 11/2022 Ma .................. G01R 33/5601
2024/0361412 A1* 10/2024 Ma .................. G06T 11/005

OTHER PUBLICATIONS

Davies Mike et al.: "A Compressed Sensing Framework for Magnetic Resonance Fingerprinting"; SIAM Journal on Imaging Sciences; vol. 7; No. 4; Jun. 6, 2014 (Jun. 6, 2014), pp. 2623-2656, XP055797785; DOI: 10.1137/130947246; Retrieved from the Internet: URL:https://arxiv.org/pdf/1312.2465.pdf>.

Komodakis G. et al.: Performance vs computational efficiency for optimizing single and dynamic mrfs: Setting the state of the art with primal-dual strategies, Computer Vision and Image Understanding, vol. 112, No. 1, pp. 14-29, 2008.

Fang Zhenghan et al.: "Deep Learning for Fast and Spatially Constrained Tissue Quantification from Highly Accelerated Data in Magnetic Resonance Fingerprinting"; IEEE Transactions on Medical Imaging, IEEE, USA; vol. 38; No. 10; Oct. 1, 2019 (Oct. 1, 2019); pp. 2364-2374; XP011748186; ISSN: 0278-0062; DOI: 10.1109/TMI.2019.2899328 [retrieved on Oct. 1, 2019].

Cline Christopher C. et al.: "AIR-MRF: Accelerated Iterative Reconstruction for Magnetic Resonance Fingerprinting", Magnetic Resonance Imaging; vol. 41; Jul. 14, 2017 (Jul. 14, 2017); pp. 29-40; XP055797763.

Mahapatra D et al.: "Integrating Segmentation Information for Improved MRF-Based Elastic Image Registration", IEEE Transactions on Image Processing, IEEE, USA; vol. 21; No. 1, Jan. 1, 2012 (Jan. 1, 2012); pp. 170-183; XP011411992; ISSN: 1057-7149, DOI: 10.1109/TIP.2011.2162738.

Komodakis G. et al.: "Approximate Labeling via Graph Cuts Based on Linear Programming," IEEE Transactions on Pattern Analysis and Machine Intelligence, vol. 29, No. 8, pp. 1436-1453, 2007.

\* cited by examiner

FIG 3

PROCESSING MEASUREMENT INFORMATION TO SELECT LABELS FOR VOXELS OR PIXELS OF A MEDICAL IMAGE DATASET

CROSS-REFERENCE TO RELATED APPLICATIONS

The present application claims priority to and the benefit of European patent application no. EP 24158598.3, filed on Feb. 20, 2024, the contents of which are incorporated herein by reference in their entirety.

TECHNICAL FIELD

The disclosure concerns a computer-implemented method for processing measurement information to select a respective one of multiple possible labels for multiple voxels or pixels of a one-dimensional or multidimensional medical image dataset. Additionally, the disclosure concerns a data processing system, a computer program, and a computer readable medium.

BACKGROUND

Dictionary matching is a highly significant approach for implementing quantitative medical imaging, in particular to magnetic resonance imaging, since it allows multiple tissue parameters to be estimated even in the presence of complex interactions between these parameters. The quantitative determination of actual tissue parameters is highly relevant in medical imaging, since it can, e.g., allow for a more robust detection of diagnostically relevant features, e.g., due to a more robust tissue differentiation than, e.g., usual T1- or T2-weighted images, and can even allow the depiction of features that would otherwise be invisible. Dictionary matching can especially be used to generate parameter maps that describe the distribution of one or more specific parameters in the image dataset.

To perform dictionary matching in medical imaging, the matching is performed for each voxel or pixel of the medical image dataset separately. Since dictionary matching is a highly nonlinear process, even a small amount of noise in the measurement information can lead to a frequent local mislabeling and, therefore, e.g. to a high noise floor in parameter maps that are generated based on dictionary matching. While the resulting noise component can be reduced by postprocessing, e.g. by lowpass filtering, this requires a trade-off between a lower noise floor on the one hand and a resolution and sharpness of the image on the other hand.

SUMMARY

The disclosure is therefore based on the problem of improving the quality of quantitative maps in medical imaging, in particular when dictionary matching is used.

The problem is solved by a computer-implemented method for processing measurement information to select a respective one of multiple possible labels for multiple voxels or pixels of a one-dimensional or multidimensional medical image dataset based on reference information,
wherein the reference information comprises a respective reference dataset comprising multiple reference values for each one of the possible labels,
wherein each label is associated with a material parameter or a set of material parameters of a tissue that is potentially depicted in the medical image dataset,
wherein the respective label for the respective voxel or pixel is selected by using a discrete optimization algorithm to optimize a cost function,
wherein the cost function depends on:
a first partial cost function comprising a respective measure for the difference between a measurement dataset for the respective voxel or pixel and the reference dataset assigned to the label assigned to this respective voxel or pixel, and
a second partial cost function comprising a respective difference measure for multiple selected pairs of mutually different voxels or pixels, wherein the respective difference measure is a measure for the difference between the material parameters or between the sets of material parameters associated with the labels selected for the voxels or pixels of the respective pair,
wherein the measurement dataset comprises multiple measurement values that are or a single measurement value that is selected or determined from the measurement information for the respective voxel or pixel.

An optimization, especially a minimization of the first partial cost function by itself could e.g. be used to implement a labeling, using traditional dictionary matching. The incorporation of the second partial cost function into the cost function introduces a coupling between the labels at different voxels or pixels. By e.g. including terms for all pairs of neighboring voxels or pixels or terms for all pairs of voxels or pixels that are within a given distance from each other, the second partial cost function can introduce a spatial regularization as an integral part of the optimization and therefore the labeling process. Such a regularization is highly efficient in suppressing the initially discussed artificial high-frequency variation in the labeling and can therefore, e.g., noticeably increases the image quality of parameter maps based on this labeling.

The feature, that the respective label is associated with a material parameter or a set of material parameters can on the one hand be understood to mean that the label itself directly describes the material parameter or the set of material parameters. The label could, however, alternatively or additionally be associated with the material parameter or at least one of the material parameters by a look-up-table or other means of defining such an association.

The determination of an exact solution for a discrete optimization problem can be quite computationally-intensive. Such an exact solution would typically still be possible with quite reasonable computational requirements, when only the first partial cost function and therefore a purely local dictionary matching would be used, since the number of possible solutions is limited to the number of possible labels in this case. It was found that a reasonably robust determination of labels concerning a single parameter is typically possible with a moderate number of labels and associated reference datasets that could also be identified as fingerprints. For a pure $T_1$-mapping, it is typically sufficient to use less than 1000 different labels and associated fingerprints. For a pure $T_2$-mapping, a reasonable mapping quality can be reached with less than 200 different labels and associated fingerprints. For determining multiple material parameters at the same time, more than e.g. 1000 or even more than 10,000 different labels and associated fingerprints may be used. A very high precision is typically reached in this case once the number of labels and associated fingerprints reaches approximately 200,000.

The determination of an exact solution becomes more computationally intensive due to the non-locality introduced by the second partial cost function. Even when only pairs of neighboring voxels or pixels are taken into account in the second partial cost function, this can lead to an indirect coupling of the solution for any given pixels or voxel to the solutions for all other voxels or pixels. Therefore, when the number of labels is n, and the number of voxels or pixels in the medical image dataset is m, $n^m$ possible solutions would need to be considered for an exact solution. Therefore, it does seem to be counterintuitive at first to take the second partial cost function into account during the optimization. As discussed in more detail below, it was found however, that a good approximate solution for the full cost function can still be determined with reasonable computational complexity.

When describing the assignment of the respective label to the respective voxel or pixel by using integers, the optimization, e.g. the minimization or maximization of the cost function, can be considered as an integer programming problem. While an exact solution to integer programming problems is computationally intensive, a multitude of suitable approaches are known to iteratively determine approximate iterative solutions of such optimization problems.

The cost function used in the method according to the present disclosure is especially suitable for such approaches, since, as discussed later, this cost function has the same structure as the energy of a discrete Markov random field (MRF). The respective voxel or pixel in the medical image dataset can then be considered as a vertex of the graph forming the MRF. Each one of the selected pairs of mutually different voxels or pixels then corresponds to a respective edge of the MRF, and the potential functions of the MRF is identified with the difference measure.

Therefore, any of the many discrete optimization algorithms that are suitable to optimize a MRF may also be used to optimize the full cost function in the methods according to the present disclosure. Examples for such optimization algorithms may comprise algorithms based on graph-cuts, e.g., the α-expansion or the αβ-swap, or on belief propagation, e.g., loopy belief propagation or tree reweighted message-passing. For instance, the PD1, PD2 or PD3 (PD: prime-dual) algorithms and their various variants disclosed in N. Komodakis and G. Tziritas, "Approximate labeling via graph cuts based on linear programming," IEEE transactions on pattern analysis and machine intelligence, vol. 29, no. 8, pp. 1436-1453, 2007 (referred to as Komodakis (1) in the further text), or the fast prime-dual MRF optimization disclosed in N. Komodakis, G. Tziritas, and N. Paragios, "Performance vs computational efficiency for optimizing single and dynamic MRFs: Setting the state of the art with primal-dual strategies," Computer Vision and Image Understanding, vol. 112, no. 1, pp. 14-29, 2008 (referred to as Komodakis (2) in the further text), could be used as optimization algorithms.

In an embodiment, the cost function may be expressed in accordance with Eqn. 1 below as follows:

$$\sum_{p \in I} D(\hat{f}(p), \hat{s}(\theta_1(p), \ldots, \theta_N(p))) + \qquad \text{Eqn. 1}$$
$$\sum_{(p,q) \in A} w_{pq} \sum_{i=1}^{N} d_i(\theta_i(p), \theta_i(q))$$

The sum over the measure for the difference D over the individual voxels or pixels p in the medical image dataset I corresponds to the first partial cost function. $\hat{f}(p)$ corresponds to the actual measurement dataset for the respective voxel or pixel p and $\hat{s}(\theta_1(p), \ldots, \theta_N(p))$ corresponds to the reference dataset assigned to the label assigned to this respective voxel or pixel p. To show the interplay between the partial cost functions more clearly, the label itself is not explicitly referred to in the exemplary cost function given above. Instead, the label is identified by its associated set of material parameters $\theta_1(p), \ldots, \theta_N(p)$.

The second partial cost function is a sum over the selected pairs (p, q) of mutually different voxels or pixels p, q over the group A of the selected pairs. The individual summand of this outer sum corresponds to the difference measure for the difference between the different sets of the material parameters $\theta_i$ associated with the different labels selected for the different voxels or pixels p, q of the respective pair, wherein the difference measure is written as a sum of partial difference measures $d_i$ for each one of the material parameters $\theta_i$. The weighting factor $w_{pq}$ may be one in the simplest case. By scaling the weighting factor for all pairs, the strength of the spatial regularization can be adjusted. Using different weighting factors for different pairs can, e.g., allows for a different weighting of different pairs to e.g. apply a regularization that takes indirect neighbors into account, but to a lesser degree than direct neighbors, similar to the use of an extended filter kernel. It should be noted that the partial difference measures $d_i$ could be different from each other, e.g. to allow for a different weighting for the differences for different material parameters.

The energy of a discrete MRF can be written as (see, e.g., equation (1) in Komodakis (2)) in accordance with Equation 2 below as follows:

$$\sum_{p \in V} c_p(x_p) + \sum_{(p,q) \in E} w_{pq} d(x_p, x_q) \qquad \text{Eqn. 2}$$

With respect to Eqn. 2, V represents the Group of all Vertices, E represents the group of all edges, $c_p(x_p)$ represents the cost of assigning the label $x_p$ to the vertex p, and d $(x_p, x_q)$ represents the potential function. By considering each voxel or pixel as a vertex of the MRF and each selected pair of mutually different voxels or pixels as an edge of the MRF, and by setting $c_p(x_p)=D(\hat{f}(p), \hat{s}(\theta_1(p), \ldots, \theta_N(p)))$ and $d(x_p, x_q)=\Sigma_{i=1}^{N} d_i(\theta_i(p), \theta_i(q))$ the cost function may be treated as the energy of the discrete MRF and optimized accordingly.

The use of an iterative approximate solution to the optimization problem also has an additional advantage. The discrete nature of a dictionary matching normally presents a challenge to the application of spatial regularization techniques common in image reconstruction techniques, e.g., in iterative reconstructions in magnetic resonance imaging, since such iterative methods typically require a differentiable cost function for the reconstruction to, e.g., allow the use of a gradient descent algorithm. Many of the mentioned discrete optimization algorithms do, however, use an optimization of continuous variables to find an approximate solution for the discrete optimization. Such algorithms are well-suited to be used in conjunction with other approaches for iterative optimization of the medical image dataset, especially with iterative reconstruction methods.

Appropriate distance functions to determine the respective measure for the difference between the respective measurement dataset and the respective reference dataset and/or for determining the respective difference measure for the respective selected pair of pixels or voxels are, e.g., the Euclidean distance or the cosine distance. For normalized reference datasets, these will define the same optimum.

The labeling can e.g. be used to generate a parameter map for at least one material parameter based on the labels assigned to the voxels or pixels. After the labeling is complete, it is possible for example to generate a parameter map directly by assigning the value of the material parameter or of one on the material parameters of the set of material parameters associated to the respective label to the respective voxel or pixel. Alternatively or additionally, derived parameter maps may be generated by determining the value of the parameter map at the respective voxel or pixel based on multiple material parameters of the respective material parameter set and/or by taking at least one additional parameter, e.g. a global parameter like the weight and/or the gender of a patient, into account.

The medical image dataset may comprise any suitable number of dimensions. As an illustrative example, the medical image dataset may be a two-dimensional, three-dimensional, or four-dimensional medical image dataset. The multiple measurement values or the single measurement value may be explicitly or implicitly specified by the measurement information. It is possible for instance that the measurement information comprises one or multiple magnetic resonance signals that are first reconstructed to specify at respective measurement value for multiple points in time for each voxel or pixel of the medical image dataset. In most use cases, the different measurement values for the respective voxel or pixel will concern the same type of measurement data, e.g., a magnetic resonance signal. In principle, it would however also be possible to provide data from multiple imaging methods, e.g., from a combined magnetic resonance tomography and an x-ray based computer tomography registered to the magnetic resonance tomography to provide different measurement values for the respective measurement dataset.

The number of measurement values in each measurement dataset may be identical to the number of reference values in each of the reference datasets. The reference dataset may for instance be obtained by simulations of known acquisition physics, for example based on Bloch simulations or extended phase graph simulations of magnetic resonance imaging sequences. Alternatively or additionally, it may be based on analytical equations based on the known physics of the measurements.

While the use of multiple measurement values in the measurement dataset that are selected or determined from the measurement information for the respective voxel or pixel may improve the robustness of the dictionary matching, in some use cases it may be sufficient to use a measurement dataset only comprising a single measurement value. The measurement information may be acquired outside of the claimed method. The measurement information may for instance be received from a database, a server, an internal memory of a medical imaging device, from the internal memory of or from a different subroutine running on a data processing system implementing the claimed method, etc. Alternatively, the measurement information may be acquired by performing the relevant measurements as a step of the claimed computer-implemented method.

Each of the voxels or pixels of the medical image dataset may be part of at least one of the selected pairs of voxels or pixels that also comprises a further one of the voxels or pixels that is adjacent to that voxel or pixel. By taking pairs of adjacent voxels or pixels into account in the second partial cost function, a spatial regularization can be applied to the labeling of the medical image dataset. This may especially reduce high-frequency noise while avoiding or reducing a blurring of the image and an elimination of fine detail, which would result from a filtering or a similar postprocessing that could be used to lower in the noise floor.

When the medical image dataset is an at least two-dimensional medical image dataset, each of the voxels or pixels of the medical image dataset may for example be at least part of one or two of the selected pairs of voxels or pixels, which also comprises a further one of the voxels or pixels that is adjacent to that voxel or pixel in the respective dimension, for each of the dimensions of the medical image dataset. For instance, each one of the voxels or pixels may share a respective selected pair with each one of its neighbors in each one of the dimensions.

Therefore, a pixel in a two-dimensional medical image dataset that is not located at the edge or corner of the medical image dataset may at least be a member of four selected pairs that it shares with its neighbors. A voxel in a three-dimensional medical image dataset that is not located at the edge, corner, or outer surface of the medical image dataset, may at least be a member of six selected pairs that it shares with its neighbors and a voxel in a four-dimensional medical image dataset that is not located at the edge, corner, or outer surface of the medical image dataset may at least be a member of eight selected pairs, that it shares with its neighbors.

The selected pairs may be explicitly defined in the algorithm or, e.g., be defined by a kind of convolution kernel or filter kernel that describes, which of the close by voxels or pixels should be paired with each of one of the voxels or pixels.

It should be noted that different weights may be assigned to the different measures for different selected pairs in the cost function. Such weights may especially be defined by a convolution kernel or filter kernel, which defines the spatial regularization and therefore how strongly the label of a respective pixel or voxel is influenced by the labels of the different voxels or pixels in the neighborhood surrounding the respective pixel or voxel.

In an embodiment, the measurement information may be based on a magnetic resonance measurement sequence. Measurement information based on a magnetic resonance sequence, e.g. on a magnetic resonance tomography sequence, is especially suitable to depicted material contrast, e.g. a contrast between different tissues and/or between different fluids within a patient and/or between fluid and tissue, based on magnetic resonance fingerprinting, or other dictionary matching techniques. The embodiments discussed herein may, however, also be used for other application such as for instance to evaluate X-ray, computer tomography or emission tomography data, wherein the different measurement values of the respective measurement dataset could, e.g., correspond to the intensities at different photon energies.

The material parameter may be or the set of material parameters can comprise at least one of: a $T_1$-time and/or a $T_2$-time and/or a spin density and/or a measure for the amount of a specific tissue and/or fluid in the respective voxel or pixel. The mentioned material parameters may be highly relevant when evaluating the medical image dataset and are well suited for a determination using magnetic resonance fingerprinting or related techniques based on dictionary matching.

The magnetic resonance measurement sequence may comprise a sequence of a partial sequences, wherein the measurement information comprises multiple preliminary medical image datasets, or wherein multiple preliminary medical image datasets are determined based on the measurement information, wherein each one of the preliminary medical image datasets is based on partial measurement information acquired during a respective partial sequence, wherein each one of the preliminary medical image datasets provides a respective one of the multiple measurement values for the respective measurement set, wherein the partial sequences differ from each other concerning the number and/or order and/or types of excitation pulses used during the respective partial sequence and/or concerning the timing of the excitation pulses during the respective partial sequence.

By varying the number and/or order and/or types and/or timing of the used excitation pulses between the different partial sequences, the measurement values provided by the different preliminary medical image datasets for the respective voxel or pixel may, e.g., depend on different combinations of the various material parameters.

It is possible, for instance, that one of the preliminary medical image datasets is strongly dependent on $T_1$-times and weakly dependent on $T_2$-times, while a second one of the preliminary medical image datasets is weakly dependent on $T_1$-times and strongly dependent on $T_2$-times. Even in cases, wherein both of the preliminary medical image datasets additionally depend on one or more further material parameters, e.g. on a local a spin density, the discussed labeling based on dictionary matching can be used to, e.g. determine parameter maps for the $T_1$- and $T_2$-times that are at least approximately independent of from each other and the additional material parameter or parameters. To improve the robustness of the labeling and therefore of the determination of the respective local value of the respective material parameter and/or to allow for the determination of a larger number of material parameters, the use of more than two partial sequences is typically advantageous.

The magnetic resonance measurement sequence may comprise multiple different partial sequences, wherein the different partial sequences could be used independently during a medical imaging to the provide different types of contrast, e.g., different degrees of $T_1$- or $T_2$-weighting. It is however also possible to use a pseudo-random variation e.g., of the flip-angles and/or of a used to timing, to generate a fingerprint of the respective tissue depicted in the respective voxel or pixel that is characteristic for this tissue and the used pseudo-random sequence.

The number of pulses and/or of their order may, e.g. be varied to use different types of imaging sequences, e.g. to use a spin echo sequence in some of the partial sequences and an inversion recovery sequence in the other partial sequences. Additionally, the number of pulses in the partial sequence can be varied to, e.g. use a $T_2$-preperation pulse in only some of the partial sequences. This approach and/or a variation of the timing within the respective sequence can, e.g. be used to achieve different degrees of $T_1$- and/or $T_2$-weighting in the different partial sequences.

Different types of excitation pulses may include for example excitation pulses with different flip-angles. A variation of the pulse type between partial sequences may provide different sequence types as partial sequences, as discussed above, and/or to apply, e.g. relatively small pseudo-random variations of the flip angles between the different partial sequences for a pseudo-random fingerprinting.

Each part of the magnetic resonance measurement sequence may in principle be considered as a separate medical imaging sequence providing a separate preliminary medical image dataset. It is however, e.g. possible, to use a relatively short waiting time between the different partial sequences, therefore allowing for an influence of the excitation pulses during the previous partial sequence on the preliminary medical image dataset acquired during the current partial sequence.

The magnetic resonance measurement sequence may be designed to provide measurement information suitable for an evaluation using magnetic resonance fingerprinting or a different dictionary matching technique. Additionally or alternatively, the selection of the respective label for the respective voxel or pixel can be based on magnetic resonance fingerprinting or the or a different dictionary matching technique. Details and advantages of dictionary matching techniques, and for instance of fingerprinting techniques, were already discussed above.

The reference dataset may be based on magnetic resonance pulse sequence simulations and/or equations describing signal evolutions in magnetic resonance imaging. The simulation may be performed using, e.g., Bloch simulations or Extended Phase Graph simulations, and both approaches are well known. The signal evolution in magnetic resonance imaging may for example be described using the well-known Bloch equations. While these can be used to determine approximate solutions in the context of a simulation of a magnetic resonance imaging, in many use cases it is also possible to find an exact solution.

In general, the reference dataset may be based on reference measurements and/or on a simulation of an imaging technique, on which the measurement information is based, and/or on a solution of analytical equations describing the physics of that imaging technique. It is, e.g. possible to perform reference measurements on one or multiple phantoms with a known distribution of material parameters to determine the reference data. Examples for the use of simulations and the solving of analytical equations to determine the reference dataset where already given above.

The discrete optimization algorithm may be based on a primal-dual optimization approach. The following example of such an algorithm is based on the detailed discussion of the primal-dual schema in section 3 of Komodakis (2). For ease of explanation, it is assumed that the cost function is to be minimized and that it was already rewritten in the form of the energy of a discrete MRF, as discussed above. The approach can obviously be easily modified to allow for a maximization of the cost function and can also be directly applied to the cost function without an explicit rewrite.

The MRF energy that is to be minimized may be essentially linearized by introducing two types of indicator variables. The indicator variables $x_p(a)$ are used for indicating which label is assigned to each MRF node. If $x_p(a)=1$, label a is assigned to p, and otherwise $x_p(a)$ may be zero. The indicator variables $x_{pq}(a,b)$ are used to indicate which pair of labels is assigned to each pair of neighboring nodes (a,b). If $x_{pq}(a,b)$ is 1, the label a is assigned to p and the label b is assigned to q. The primal problem is then to minimize the function:

$$\sum_{p \in V} \sum_{a \in L} c_p(a) x_p(a) + \sum_{(p,q) \in E} w_{pq} \Bigl( \sum_{a,b \in L} d(a, b) x_{pq}(a, b) \Bigr). \quad \text{Eqn. 3}$$

The variables $x_p$, $x_{pq}$ are used as the primal variables during the optimization.

According to Komodakis (2), the dual problem may then be a maximization problem with the dual variables $y_{pq}(a)=-y_{qp}(a)$ for each label a and edge (q, p) and the problem can be reformulated using the auxiliary variables in accordance with Equation 4 below.

$$h_p(a) = c_p(a) + \sum_{(p,q)\in E} y_{qp}(a), \qquad \text{Eqn. 4}$$

for each vertex p and label a and using the notation $x_p$ to indicate the active label at the vertex p to read:

$$h_p(x_p) = \min_{a \in L} h_p(a) \qquad \text{Eqn. 5}$$

$$y_{pq}(x_p) + y_{qp}(x_q) = w_{pq}d(x_p, x_q) \qquad \text{Eqn. 6}$$

$$y_{pq}(a) + y_{qp}(b) \leq 2w_{pq}d_{max} \qquad \text{Eqn. 7}$$

The constant $d_{max}$ is the maximum value that d(a,b) may reach for an arbitrary pair of labels a, b. The optimization alternates between updating the dual variables $y_{pq}$ and $y_{qp}$, and therefore the height $h_p(a)$ of the respective label at the respective vertex, using the previously stated conditions and selecting the active label for the respective vertex p. The update of the dual variables can be performed individually for each one of the labels and can, e.g. be performed by solving a max-flow problem in a capacitated graph defined by these variables, as discussed in detail in section 4 of Komodakis (2). A detailed derivation of the discussed approach is, e.g., given in Komodakis (1).

In addition to the computer-implemented method, the disclosure also described a data processing system, characterized in that the data processing system is configured to carry out the computer-implemented method for processing measurement information according to the present disclosure.

Additionally, the disclosure concerns a data processing system, which is configured to carry out the previously discussed computer-implemented method. The data processing system can, e.g., be a desktop computer, a server or be implemented as a cloud solution. Additionally or alternatively, the data processing system may be integrated into a medical imaging device. The data processing system may have hardware and/or software interfaces for receiving the various inputs as discussed above.

The disclosure also concerns a computer program that comprises instructions to carry out the previously discussed computer-implemented method when the program is executed on a data processing system.

Additionally, the disclosure concerns a computer-readable medium comprising this computer program.

BRIEF DESCRIPTION OF THE DRAWINGS

Other objects and features of the present disclosure will become apparent from the following detailed description considered in conjunction with the accompanying drawings. The drawings, however, are only principle sketches designed solely for the purpose of illustration and do not limit the disclosure. The drawings show.

DETAILED DESCRIPTION OF THE DISCLOSURE

Figure 1:
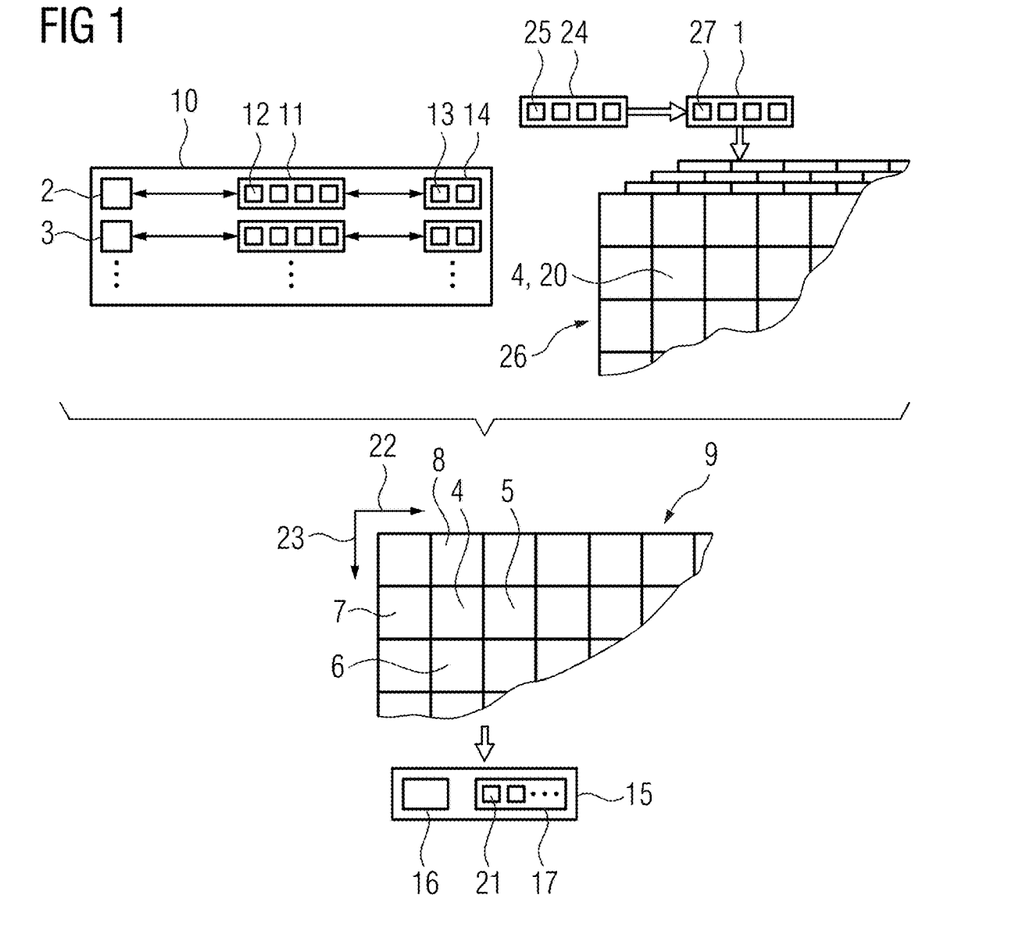
FIG. 1 illustrates an overview of relevant features and data structures in an exemplary embodiment of the computer-implemented method for processing measurement information according to the present disclosure.

FIG. 1 gives an overview of relevant features and data structures of a computer-implemented method for processing measurement information 1 to select a respective one of multiple possible labels 2, 3 for the pixels 4-8 of a two-dimensional medical image dataset 9 based on reference information 10. As already discussed above, the method may be modified to label a medical image dataset with a single dimension or with more than 2 dimensions. In the latter case, the labels 2, 3 would be applied to voxels instead of pixels 4-8.

Figure 2:
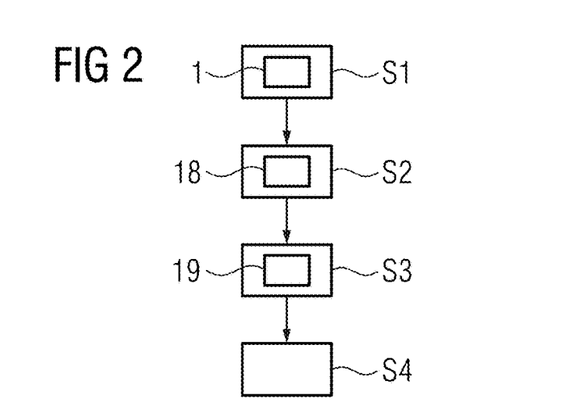
FIG. 2 illustrates an example flow chart of the embodiment according to FIG. 1.

The method will be discussed in conjunction with FIG. 2 that shows a flowchart of the method, and FIG. 3 that shows a possible use case for the method and a data processing system 28 implementing the method.

In step S1, measurement information 1 is received. In the example shown in FIG. 3, the measurement information 1 is received by the data processing system 28 from a medical imaging device 33. The measurement information 1 may be received immediately after its acquisition by imaging the patient 34 using the medical imaging device 33 or, e.g. be stored and received at a later point in time.

In the example, the measurement information 1 is based on a magnetic resonance measurement sequence 24, which comprises a sequence of a partial sequences 25. In the example, four partial sequences 25 are used, which acquire respective partial measurement information 27 concerning the same volume by using different magnetic preparations, e.g., inversion recovery and T2 preparation pulses, respectively. As already discussed in the general part of the description, it is, e.g. alternatively possible to use a pseudo-random variation of acquisition parameters between the partial sequences 25.

Based on each partial measurement information 27, a respective preliminary medical image datasets 26 may then be reconstructed. Since four medical image datasets 26 are reconstructed and each one of the medical image datasets 26 provides a separate measurement value 20 for each pixel 4-8, a measurement dataset 18 comprising four separate measurement values 20 may then be provided for each of the pixels 4-9 of the medical image dataset 9 in step S2.

In step S3, a respective label 2, 3 is selected for the respective pixel 4-8 by using a discrete optimization algorithm 19 to optimize a cost function 15. The respective label 2, 3 is defined by the reference information 10 that comprises a respective reference dataset 11 comprising multiple reference values 12 for each one of the possible labels 2, 3. Additionally, the reference information 10 assigns a set 14 of material parameters 13 to each one of the labels. In the example, the two material parameters 13 define a T1-time and T2-time associated with the respective label.

The reference information 10 therefore defines a correlation between the material parameters 13 and a fingerprint defined by the reference information 10. It should be noted that the label could be directly defined by the material parameters 13 and does not need to be a distinct information.

In the example, 1339 labels that correspond to 103×103 combinations of a T1-time and a T2-time are used. The reference values 12 may, e.g. be obtained via 1D Bloch simulations. The T1- and T2-times can be logarithmically spaced in intervals of 80 ms to 1600 ms and of 16 ms to 320 ms, respectively.

The cost function 15 is the sum of two partial cost functions 16, 17. The first partial cost function 16 comprises a respective measure for the difference between the measurement dataset 18 for the respective pixel 4-8, and therefore the fingerprint measured for that pixel and the reference dataset 11 assigned to the label 2, 3 assigned to this pixel 4-8. The minimization of the partial cost function 15 by itself would correspond to a separate dictionary matching for each individual pixel 4-8 without any consideration of the spatial proximity between the pixels 4-8. Such a purely local optimization usually results in a spatially unstable result due to the potentially complex topology of the dictionary, translating into noisy parameter maps.

The second partial cost function 17 comprises a respective difference measure for multiple selected pairs 21 of adjacent pixels 4-8. In the example, the pixel 4 would be a member of two selected pairs 21 of pixels for each one of the dimensions 22, 23 of the medical image dataset 9, namely of the pairs (4, 5), (4, 6), (4, 7) and (4, 8).

The second partial cost function 17 may comprise separate summands for each selected pair 21 of pixels 4-8 and each one of the material parameters 13. Different weighting factors may be used for the summands for the different material parameters 13. In an exemplary embodiment, good results were achieved with the weight w1=5*10−6 for summands concerning T1-times and the weight w2=1.5*10−5 for summands concerning T2-times, respectively. The individual summand can be determined by taking the absolute value of the difference of the values of the respective material parameters 13 between the pixels 4-8 in the pair 21.

The cost function is minimized in this example by using the fast prime-dual MRF optimization disclosed in Komodakis (2) that was already discussed in the general part of the description. The cosine distance is used as the measure for the difference between a measurement dataset 18 for the respective pixel 4-8 and the reference dataset 11 assigned to the label 2, 3 assigned to the respective pixel 4-8.

Once this optimization is concluded, a respective parameter map is generated for each one of the material parameters 13 in step S4, based on the respective label 2, 3 assigned to the respective pixel 4 to 8. In an alternate embodiment, the parameter map may be directly created by the assignment of the respective label 2, 3 to the respective pixel 4 to 8, e.g., when the value of the label 2, 3 directly corresponds to the material parameter 13, or comprises a concatenation of the material parameters 13 of the set 14.

The exemplary embodiment therefore generates accurate and spatially regulated T1- and T2-maps. Compared to parameter maps that are based on purely local fingerprinting, e.g. on a minimization of the first partial cost function by itself, a notably lower high frequency noise was observed in phantom measurements as well as in in-situ measurements, e.g. when imaging the liver of a patient.

Figure 3:
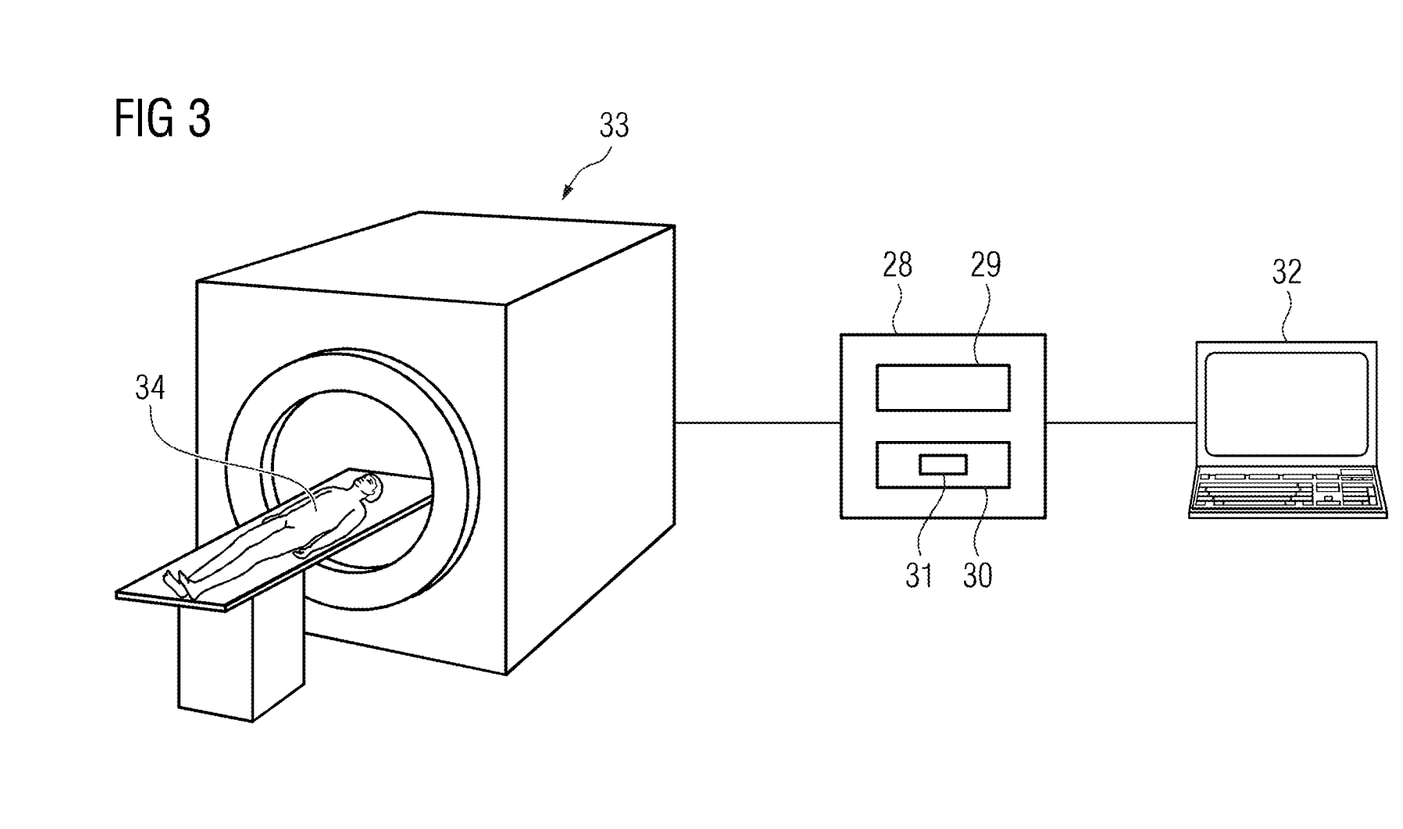
FIG. 3 illustrates an exemplary embodiment of the data processing system according to the present disclosure.

As shown in FIG. 3, the data processing system 28 may be implemented by executing a computer program 31 on a programmable processor 29. The computer program 31 may, e.g., be stored in an internal memory 30 of the data processing system 28. The generated parameter maps may, e.g. be output to the personal computer 32.

In the present example, the data processing system 28 may be configured as a separate device and may, e.g. be implemented as a server or as a cloud solution. It would, however, also be possible to integrate the processing system 28 into the medical imaging device 33 or into the personal computer 32.

Independent of the grammatical term usage, individuals with male, female or other gender identities are included within the term.

What is claimed is:

1. A computer-implemented method, comprising:
processing measurement information to select a respective one of multiple possible labels for multiple voxels or pixels of a one-dimensional or a multidimensional medical image dataset based on reference information,
wherein the reference information comprises a respective reference dataset comprising multiple reference values for each one of the possible labels,
wherein each label is associated with a material parameter or a set of material parameters of a tissue that is potentially depicted in the medical image dataset,
wherein the respective label for the respective voxel or pixel is selected by using a discrete optimization algorithm to optimize a cost function,
wherein the cost function depends on:
a first partial cost function comprising a respective measure for a difference between a measurement dataset for the respective voxel or pixel and the reference dataset assigned to the label assigned to the respective voxel or pixel, and a second partial cost function comprising a respective difference measure for multiple selected pairs of mutually different voxels or pixels,
wherein the respective difference measure is a measure for the difference between the material parameters or between the sets of material parameters associated with the labels selected for the voxels or pixels of the respective pair, and
wherein the measurement dataset comprises multiple measurement values that are selected or determined from the measurement information for the respective voxel or pixel or a single measurement value that is selected or determined from the measurement information for the respective voxel or pixel.

2. The computer-implemented method according to claim 1, wherein each of the voxels or pixels of the medical image dataset is part of at least one of the selected pairs of voxels or pixels that also comprises a further one of the voxels or pixels that is adjacent to that voxel or pixel.

3. The computer-implemented method according to claim 1, wherein the medical image dataset is at least a two-dimensional medical image dataset, and
wherein each of the voxels or pixels of the medical image dataset is at least part of one or two of the selected pairs of voxels or pixels, which also comprises a further one of the voxels or pixels that is adjacent to that voxel or pixel in the respective dimension, for each of the dimensions of the medical image dataset.

4. The computer-implemented method according to claim 1, wherein the measurement information is based on a magnetic resonance measurement sequence.

5. The computer-implemented method according to claim 4, wherein the material parameter or the set of material parameters comprises one or more of: a $T_1$-time and/or a $T_2$-time, a spin density, a measure for an amount of a specific tissue, or fluid in the respective voxel or pixel.

6. The computer-implemented method according to claim 4,
wherein the magnetic resonance measurement sequence comprises a sequence of partial sequences, the measurement information comprises multiple preliminary medical image datasets, or multiple preliminary medical image datasets are determined based on the measurement information, wherein each one of the preliminary medical image datasets is based on partial measurement information acquired during a respective partial sequence, wherein each one of the preliminary medical image datasets provides a respective one of the multiple measurement values for the respective measurement set, and wherein the partial sequences differ from each other concerning a number and/or order and/or types of excitation pulses used during the respective partial sequence and/or concerning a timing of the excitation pulses during the respective partial sequence.

7. The computer-implemented method according to claim 4, wherein the magnetic resonance measurement sequence is configured to provide measurement information suitable for an evaluation using magnetic resonance fingerprinting or a different dictionary matching technique, and/or the selection of the respective label for the respective voxel or pixel is based on magnetic resonance fingerprinting or a different dictionary matching technique.

8. The computer-implemented method according to claim 4, wherein the reference dataset is based on magnetic resonance pulse sequence simulations and/or equations describing signal evolutions in magnetic resonance imaging.

9. The computer-implemented method according to claim 1, wherein the reference dataset is based on (i) reference measurements, (ii) a simulation of an imaging technique on which the measurement information is based, and/or (iii) a solution of analytical equations describing physics of the imaging technique.

10. The computer-implemented method according to claim 1, wherein the discrete optimization algorithm is based on a primal-dual optimization approach.

11. A non-transitory computer-readable medium, comprising instructions that, when executed by a data processing system:

process measurement information to select a respective one of multiple possible labels for multiple voxels or pixels of a one-dimensional or a multidimensional medical image dataset based on reference information, wherein the reference information comprises a respective reference dataset comprising multiple reference values for each one of the possible labels, wherein each label is associated with a material parameter or a set of material parameters of a tissue that is potentially depicted in the medical image dataset, wherein the respective label for the respective voxel or pixel is selected by using a discrete optimization algorithm to optimize a cost function, wherein the cost function depends on:
　a first partial cost function comprising a respective measure for a difference between a measurement dataset for the respective voxel or pixel and the reference dataset assigned to the label assigned to this respective voxel or pixel, and
　a second partial cost function comprising a respective difference measure for multiple selected pairs of mutually different voxels or pixels, wherein the respective difference measure is a measure for the difference between the material parameters or between the sets of material parameters associated with the labels selected for the voxels or pixels of the respective pair, and wherein the measurement dataset comprises multiple measurement values that are selected or determined from the measurement information for the respective voxel or pixel or a single measurement value that is selected or determined from the measurement information for the respective voxel or pixel.

* * * * *